Aug. 18, 1970  J. E. NICHOLSON ET AL  3,524,608
RAIN EROSION PROTECTIVE DEVICE

Filed Jan. 22, 1968  2 Sheets-Sheet 1

INVENTORS
JAMES E. NICHOLSON
RICHARD H. ADAMS

BY

ATTORNEY

INVENTORS
JAMES E. NICHOLSON
RICHARD H. ADAMS

United States Patent Office 3,524,608
Patented Aug. 18, 1970

3,524,608
RAIN EROSION PROTECTIVE DEVICE
James E. Nicholson, Sudbury, and Richard H. Adams, Bedford, Mass., assignors to Sanders Associates, Inc., Nashua, N.H., a corporation of Delaware
Filed Jan. 22, 1968, Ser. No. 699,465
Int. Cl. B64d 45/00
U.S. Cl. 244—1                                              17 Claims

ABSTRACT OF THE DISCLOSURE

Apparatus for the protection of aerodynamic surfaces from rain erosion whereby a region of high impact pressure air is trapped ahead of the surface being protected which is operative to disintegrate raindrops prior to their impact upon the surface.

BACKGROUND OF THE INVENTION

The present invention relates generally to aerodynamic devices and more particularly to apparatus for the protection of aerodynamic surfaces from damage by rain erosion. The apparatus of the present invention is particularly suited to provide such protection for vulnerable surfaces (e.g. radomes, IR domes and the like) carried by missiles and aircraft wherein a sensor disposed behind the surface is required to have an unobstructed view when the apparatus is in place.

DESCRIPTION OF THE PRIOR ART

Rain erosion of high speed aerodynamic surfaces has been of concern since the introduction of the first high-speed all-weather military aircraft. As aircraft speeds have increased it has become evident that raindrops are capable of totally destroying such surfaces as optical windows and radomes carried by such aircraft. Prior attempts have been made to prevent damage of aerodynamic surfaces by airborne particles, however, these attempts have involved the use of a physical body disposed ahead of the surface to be protected and in many cases are limited in their operation to supersonic velocities. Typical of the prior art relating to this type of protective device is U.S. Pat. No. 3,236,-093 which issued to F. D. Werner on Feb. 22, 1966. A physical structure is disposed ahead of the surface to be protected from damage whereby particulate matter in the atmosphere is deflected prior to striking the surface. This solution to the problem of rain erosion clearly precludes the existence of an unobstructed forward field-of-view from the surface being protected.

OBJECTS OF THE INVENTION

It is thus a primary object of the present invention to provide a new and novel method and apparatus for the prevention of damage to aerodynamic surfaces by rain erosion which does not obstruct the forward field-of-view from the surface protected thereby.

It is an additional object of the present invention to provide apparatus of the above described nature which is independent in its operation on the formation of an aerodynamic shock wave.

It is another object of the present invention to provide apparatus of the above described nature which may be automatically removed at a preselected time in a reliable and predetermined manner.

It is a further object of the present invention to provide a new and novel rain erosion protection device which reduces the aerodynamic drag of the surface which is protects.

It is yet another object of the present invention to provide a new and novel rain erosion protection device which reduces the aerodynamic heating rate of the surface protected thereby.

These and other objects, features and advantages of the present invention will become more apparent from the detailed discussion considered in conjunction with the accompanying drawings. The scope of the invention will be indicated in the claims.

SUMMARY OF THE INVENTION

The present invention forms a chamber about a volume of space ahead of the surface which is to be protected. The forward end of the chamber is open to the surrounding environment and the rearward extremity of the chamber is secured about the surface to be protected. The length of the chamber is determined according to the density of the surrounding environment, the speed at which the surface moves and the diameter of the particulate matter to be disintegrated. As the vehicle moves through the atmosphere ram air is admitted to the chamber through its open forward end. Thus a region of high impact pressure air which is substantially at rest with respect to the surface is trapped within the chamber and moves with the velocity of the vehicle. Particulate matter in the atmosphere which enters the forward end of the device impinges on this region of high impact pressure air and is thereby disintegrated. The open forward end of the device further permits an unobstructed field of view in the forward direction for any sensor disposed behind the surface being protected. A further advantage of the present invention is that a net improvement in aerodynamic performance from that of an unprotected surface may be realized.

In one form the apparatus of the present invention may be permanently affixed such that it provides rain erosion protection to a dome or window disposed on an aircraft.

In a further embodiment the apparatus may be mounted to the forward end of a missile or other aerodynamic vehicle such that it may be automatically removed at a preselected time.

DESCRIPTION OF THE PREFERRED EMBODIMENT

Figure 1:
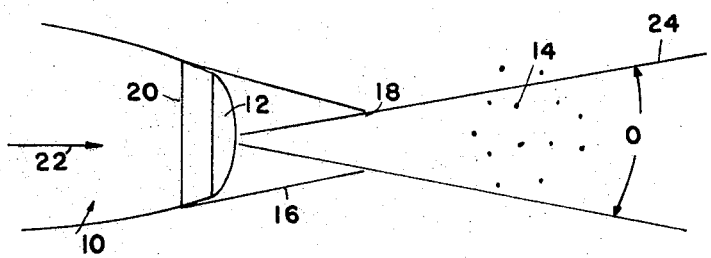
FIG. 1 is a schematic representation of the present invention.

Referring now to FIG. 1 there is illustrated a schematic representation of the present invention. A parent vehicle 10 such as an aircraft or missile having a surface 12, for example a fiberglass radome glass optical window or a thin metal which is vulnerable to damage by rain erosion, is required to operate through regions of the atmosphere containing concentrations of raindrops 14 or other particulate matter such as dust. The present invention is illustrated as a conical element protective device 16 having an open forward end 18 and mounted at its opposite end 20 to the body of the parent vehicle 10 such that the vulnerable surface 12 is encompassed thereby. The protective device 16 may be fabricated of any material having sufficient structural integrity to withstand the aerodynamic environment such as for example aluminum or a reinforced, injection molded plastic. As the vehicle moves through the atmosphere in the direction indicated by the arrow 22 ram air enters the forward end of the protective device 16 thus creating a region of high impact pressure air therein.

This region of air has an impact pressure defined by the ambient atmospheric density and the velocity of the parent vehicle 10 and is carried along by the device 16 at the same velocity as the vehicle 10. Raindrops 14 entering the open forward end 18 of the protective device 16 are impingent upon the aforesaid region of high impact pressure air and, as will be more fully explained below, are distintegrated thereby into droplets of such small dimension that substantially no damage is incurred by the surface 12. It will be noted that although efficient protection from rain erosion damage is afforded the surface 12 by the protective device 16 an unobstructed forward field-of-view 24 remains available should it be desired to locate sensing apparatus such as radar, infrared or optical receiving system (not shown) behind the surface 12. It will further be noted that the present invention is not limited in its operation to any particular velocity. Rain erosion protection is provided equally well at subsonic, transonic and supersonic velocities since operation is not dependent upon the formation of an aerodynamic shock wave ahead of the vehicle 10.

Figure 2:
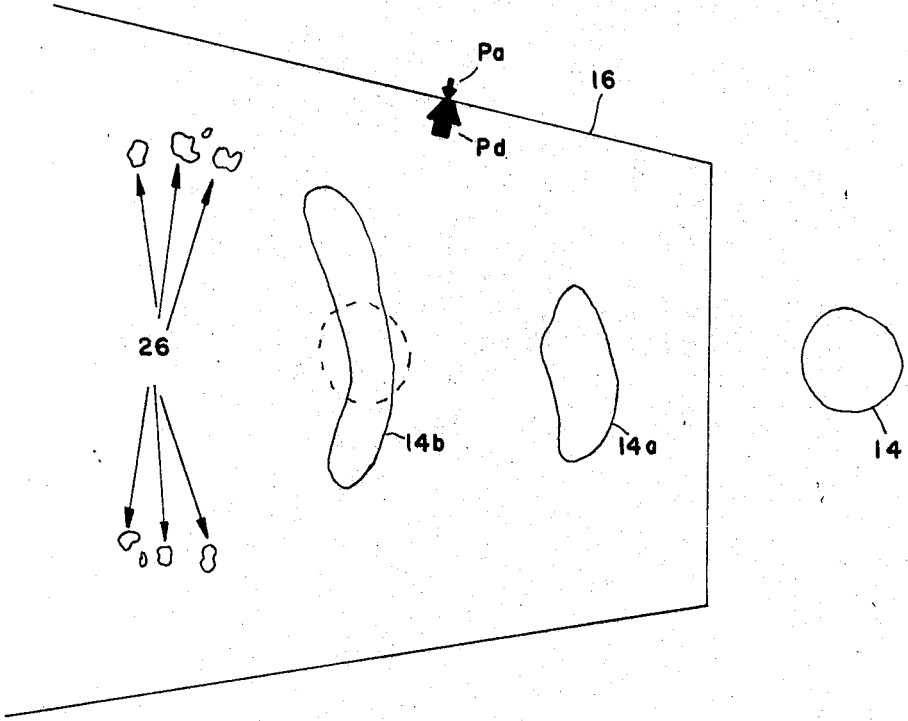
FIG. 2 is a schematic illustration of the manner in which raindrop disintegration is provided.

FIG. 2 presents an expanded schematic illustration of the manner in which the present invention provides for the distintegration of raindrops 14 which, if permitted to impact directly on the surface being protected, would cause extensive erosion damage. The present invention 16 creates a region of air ahead of the surface to be protected of a high impact pressure $P_d$ which is greater than the ambient pressure of the atmosphere $P_a$. Thus raindrops 14 entering the protective device 16 are subjected to a sudden impact with the high pressure air. Upon entry into the device 16 the drop begins to flatten into a disc shaped configuration 14a. As the breakup proceeds the drop continues to flatten until the forces on the drop 14b exceed its surface tension and tiny droplets of water 26 are stripped away from the disc. The droplets 26 in actual practice form an aerosol which is substantially harmless to the surface being protected. The physical extent of the region of high impact pressure required to substantially preclude rain erosion damage has been found to be a function of the density of the high impact pressure region of ram air created by the protective device 16 and the initial diameter of the raindrop to be distintegrated. These parameters determine the length of the protective device 16 by the relationship $$S = [(750/\rho_d)^{1/2} - 12] d_0 \quad (1)$$

where:

S is the length of the protective device in inches,
$\rho_d$ is the ram air density created within the protective device in pounds per cubic foot,
$d_0$ is the initial diameter of the raindrop in inches, and 750 is a constant of proportionality in units of pounds per cubic feet.

The ram air density is determined for supersonic velocities by the formula $$\rho_d = \rho_a \frac{6M^2}{M^2+5} \left(1 + \frac{M^2+5}{35M^2-5}\right)^{5/2} \quad (2)$$

where:

$\rho_d$ is the ram air density in pounds per cubic foot,
$\rho_a$ is the ambient atmospheric density, and
M is the velocity of the surface expressed in Mach No.

For subsonic velocities the ram air density is defined by the relationship)

$$\rho_d = \rho_a \left(1 + \frac{M^2}{5}\right)^{5/2} \quad (3)$$

where the symbols are the same as defined hereinabove for supersonic velocitiies. It will be noted that Equations 2 and 3 for determining the ram air density are equivalent for flight at the speed of sound (i.e. $M=1.0$) and thus are continuous in their definition of the ram air density created within the protective device 16.

Thus by Equations 1 and 3 a protective device having a length of approximately 6.6 inches is adequate to protect an aerodynamic surface moving at 400 feet per second at sea level ($M=0.35$) from erosion damage by raindrops having initial diameters of approximately 0.079 inch (two millimeters). In actual practice the length of the protective device is determined for the most extreme conditions of maximum velocity, lowest atmospheric density and largest raindrop diameter expected to be encountered by the surface to be protected in its operating environment. Since the surface to be protected will typically have some intrinsic erosion strength, a length less than predicted by Equation 1 will generally be adequate to protect the surface. The extent of this reduction from the predicted value will be directly dependent upon the erosion strength of a given surface material.

In addition to the prevention of rain erosion damage the apparatus of the present invention may also provide reduction in both the aerodynamic drag and aerodynamic heating of the surface protected. In many instances the surface to be protected by apparatus of the present invention is a radome, IR dome, optical window or the like. From electronic and optical considerations it is desirable to fabricate such surfaces in a hemispherical configuration, however, aerodynamically this shape is not optimum. The present invention may be constructed in any desired aerodynamically optimized configuration such as for example a cylinder, truncated cone or truncated ogive and may provide a net reduction in the aerodynamic drag coefficient from that which is characteristic of a hemispherical shape. Further, when the above described surfaces are mounted on high velocity vehicles aerodynamic heating occurs which may be detrimental to the operation of a sensor disposed behind the surface. Without the present invention the surface could, after sustained high velocity flight, experience temperatures approaching the stagnation temperature i.e. the temperature reached at the point at which all of the kinetic energy of the airstream impingent on said surface is converted to thermal energy. Such elevated temperatures are particularly detrimental to the performance of sensors which operate in the infrared region of the electromagnetic spectrum. The present invention displaces the aerodynamic stagnation point away in the forward direction from the surface being protected thus significantly reducing the rate at which the surface is heated without introducing any obstruction into the forward field of view of the sensor.

Figure 3:
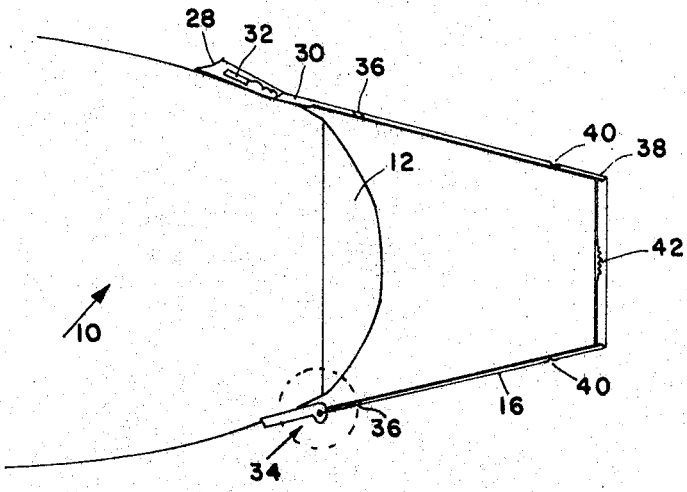
FIG. 3 is a cross-section view of one embodiment of the present invention.

In FIG. 3 there is shown a more detailed cross-sectional illustration of a further embodiment of the present invention wherein a surface 12 to be protected from rain erosion is shown mounted on a parent vehicle 10 which could be for example a missile or other projectile. In many such applications of the present invention it is desirable to remove the protective device in order to afford a sensor disposed behind the surface 12 a wider field-of-view than would be available with the protective device in place. The protective device 16 together with a circumferential mounting and deployment apparatus 28 is shown. This embodiment of the invention provides for the automatic release and separation of the protective device at some preselected time such as for example at the time a missile or projectile 10 is released from an aircraft. The mounting and deployment apparatus 28 is illustrated as having an annular configuration, however, in actual practice the configuration and dimension will be determined by the parent vehicle 10 structure, and may be secured thereto by any convenient means such as adhesives, bolts or the like. The protective device 16 is coupled to the mounting and deployment apparatus 28 by a severable attachment means such as an explosive bolt 30 which is electrically coupled to a deployment activation means 32 which may be disposed either within the mounting apparatus or within the parent vehicle 10. The protective device is further pivotally coupled at a position 34 substantially opposite the above described severable attachment means 30. This pivotal coupling 34 provides for the predictable separation of the protective device 16 from the mounting and deployment apparatus 28 in the manner described below. Also illustrated in FIG. 3 are water vent apertures 36 disposed about the circumference of the protective device 16 proximate the rearward end thereof. These vents provide for the disposal of water which would otherwise accumulate during sustained flight through rain. It is preferred that the exit area provided by the vents 36 be less than ten percent of the area of the open forward end of the protective device 16. In this manner an undesirable accumulation of water is prevented without a significant degradation of the high impact pressure region created by the protective device. FIG. 3 further illustrates a provision for the protection of the surface 12 from the effects of dust and moisture prior to the time the vehicle 10 becomes airborne. A rupturable membrane 38 may be stretched over the open forward end of the protective device 16 and secured thereto for example by an O ring 40. A portion 42 of the forward edge of the protective device 16 may be serrated or otherwise formed to provide a cutting means. The aerodynamic forces developing when the parent vehicle 10 reaches a preselected velocity force the membrane 38 against the cutting means 42 thus causing the stretched membrane 38 to be withdrawn from the forward opening in the protective device 16.

Figure 3A:
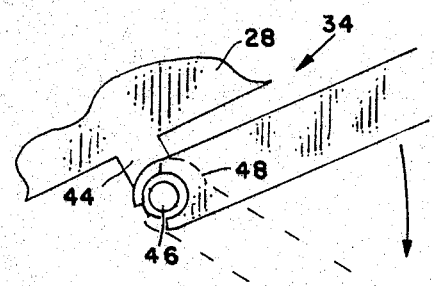
FIG. 3A is an enlarged elevation of one separation control means as applicable to the present invention.

The protective device 16 may be automatically removed at any preselected time by severing the attachment means 30. As described above the pressure within the protective device 16 is elevated with respect to the ambient atmospheric pressure thus the device experiences a net force which tends to move it forward with respect to the surface 12. A pivotal attachment means indicated generally at 34 in FIG. 3 is illustrated in greater detail in FIG. 3A. At least one projection 44 is provided in the annular mounting and deployment means 28 (partially shown). The projection 44 has a rod shaped member 46 disposed therethrough. A portion of the rearward facing edge of the protection device 16 may be formed in a configuration which is most clearly analogous to that of a J hinge. Thus as the protective device 16 moves away from the surface 12, it rotates downward about the rod shaped member 46 of the pivotal attachment means 34 and complete separation is prevented until the device has rotated sufficiently far to be carried away by the airstream without hazard to the parent vehicle 10. It will be obvious to one skilled in the art that the above described pivotal attachment means is only one of many solutions to the pivotal attachment problem which would work equally well.

It will thus be seen that the objects set forth above, among those made apparent from the preceding description are efficiently attained and since certain changes may be made in the above construction without departing from the scope of the invention, it is intended that all matter contained in the above description as shown in the accompanying drawings shall be interpreted as illustrative and not in a limiting sense.

It is also to be understood that the following claims are intended to cover all of the generic and specific features of the invention therein described and all statements of the scope of the invention, which, as a matter of language, might be said to fall therebetween.

Having described what is new and novel and desired to secure by Letters Patent, what is claimed is:

1. Apparatus for the prevention of damage to a forward surface of an airborne vehicle from erosion by particulate matter contained in the atmosphere through which said vehicle moves comprising
means for creating a pressurized region of air ahead of said surface comprising a hollow body having one end engaging said vehicle and surrounding said surface, extending forward from said surface a preselected minimum distance directly proportional to the largest diameter particulate matter to be protected against and inversely proportional to the square root of the dynamic pressure produced by movement of said vehicle through said atmosphere, and having a forward end which is open to said atmosphere, and
said pressurized region of air created thereby being substantially at rest with respect to said surface, and of a density and pressure which is greater than the ambient density and pressure of said atmosphere
whereby particulate matter entering said region creating means is subjected to impact forces into excess of the surface tension thereof and is disintegrated prior to impact upon said surface.

2. Apparatus as defined in claim 1 wherein said hollow body comprises a hollow body of revolution.

3. Apparatus as defined in claim 2 wherein said body of revolution is a truncated cone.

4. Apparatus as defined in claim 2 wherein said body of revolution is truncated ogive.

5. Apparatus as defined in claim 2 wherein said body of revolution is a cylinder.

6. Apparatus as defined in claim 1 including
a plurality of apertures disposed circumferentially in said region creating means proximate the rearward end thereof
whereby water accumulated from said disintegration of said raindrops may exit said region creating means.

7. Apparatus as defined in claim 6 wherein the total area of said plurality of apertures is no greater than ten percent of the area of said open forward end of said region creating means.

8. Apparatus as defined in claim 1 wherein said region creating means is of such preselected dimensions and configuration that said pressurized region of air created therein when said vehicle moves through said atmosphere is of sufficient density and dimension to substantially disintegrate raindrops entering said region over a preselected range of vehicle speeds and altitudes.

9. Apparatus as defined in claim 1 wherein said region creating means is of a length selected according to the realtionship $$S = \left[ \left( \frac{750}{\rho_d} \right)^{1/2} - 12 \right] d_o$$

where:

S is the length of said region creating means, in inches,
$\rho_d$ is the density of said pressurized region in pounds per cubic foot, and
$d_o$ is the initial diameter of said particulate matter in inches, and
750 is a constant of proportionality in units of pounds per cubic foot.

10. Apparatus for protecting a forward surface of an airborne vehicle from erosion damage by raindrops comprising
means for creating a pressurized region of air ahead of said surface comprising a hollow body of revolution having a forward end open to the atmosphere
said region of pressurized air created thereby being substantially at rest with respect to said surface of a density and pressure which is greater than the ambient density and pressure of said atmosphere, and
operative to disintegrate said raindrops prior to impact upon said surface
means for coupling a rearward end of said region creating means firmly to said vehicle and about surface comprising
severable first attachment means,
pivotal second attachment means, and
deployment activation means, said first and second attachment means being disposed substantially opposite each other and forming an integral portion of said coupling means, and said region creating means being
- severably coupled to said first attachment means, and
- pivotally coupled to said second attachment means.

11. Apparatus as defined in claim 10 including a plurality of apertures disposed circumferentially in said region creating means proximate the rearward end thereof whereby water accumulated from said disintegration of said raindrops may exit said region creating means.

12. Apparatus as defined in claim 11 wherein the total area of said plurality of apertures is no greater than ten percent of the area of said open forward end of said region creating means.

13. Apparatus as defined in claim 10 wherein said body of revolution is a truncated cone.

14. Apparatus as defined in claim 10 wherein said body of revolution is a truncated ogive.

15. Apparatus as defined in claim 10 wherein said body of revolution is a cylinder.

16. Apparatus as defined in claim 10 wherein said region creating means is of such preselected dimensions and configuration that said pressurized region of air created therein when said vehicle moves through said atmosphere is of sufficient density and dimension to substantially disintegrate raindrops entering said region over a preselected range of vehicle speeds and altitudes.

17. Apparatus as defined in claim 10 wherein said region creating means is of a length selected according to the relationship $$S = \left[ \left( \frac{750}{\rho_d} \right)^{1/2} - 12 \right] d_o$$

where:

$S$ is the length of said region creating means in inches,
$\rho_d$ is the density of said pressurized region in pounds per cubic foot,
$d_o$ is the initial diameter of said raindrops in inches, and
750 is a constant of proportionality in units of pounds per cubic foot.

References Cited

UNITED STATES PATENTS

| | | | |
|---|---|---|---|
| 2,343,655 | 3/1944 | Flader et al. | 244—130 |
| 3,364,742 | 1/1968 | De Leo | 73—212 |
| 3,400,583 | 9/1968 | Newport et al. | 73—212 X |

DUANE A. REGER, Primary Examiner

J. L. FORMAN, Assistant Examiner

U.S. Cl. X.R.

244—121